Figure 1:
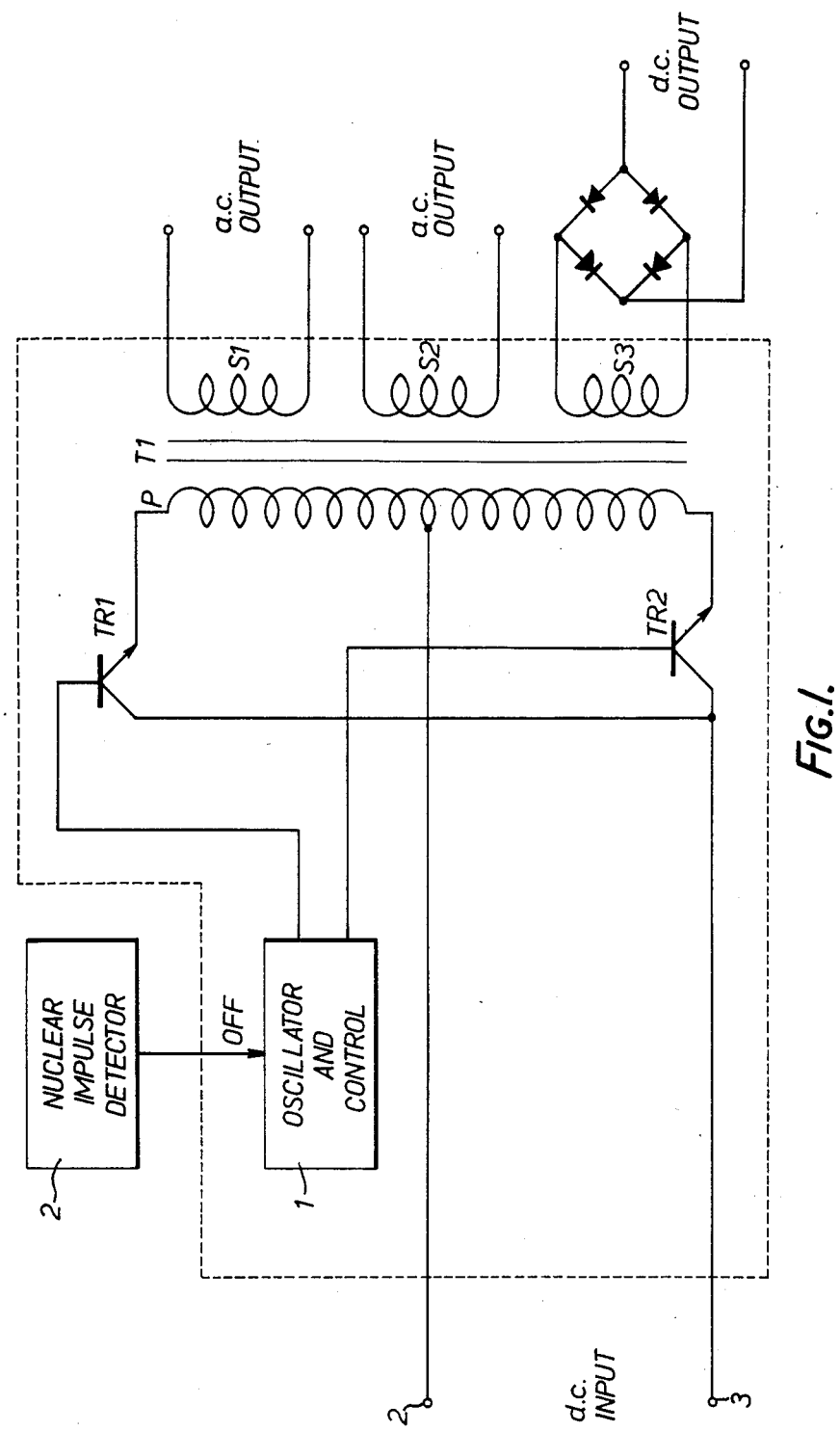

United States Patent [19]

Verity

[11] Patent Number: 4,695,937

[45] Date of Patent: Sep. 22, 1987

[54] POWER SUPPLIES

[75] Inventor: Philip R. Verity, Addlestone, England

[73] Assignee: Plessey Overseas Limited, Ilford, England

[21] Appl. No.: 584,627

[22] Filed: Feb. 29, 1984

[30] Foreign Application Priority Data

Mar. 1, 1983 [GB] United Kingdom ................ 8305645

[51] Int. Cl.$^4$ ........................................... H02M 3/335
[52] U.S. Cl. ........................................ 363/25; 363/97
[58] Field of Search ...................... 363/24, 25, 26, 97; 323/349, 350, 351; 250/336.1

[56] References Cited

U.S. PATENT DOCUMENTS 3,679,963 7/1972 Free et al. ........................... 323/315
4,464,709 8/1984 Barter ..................................... 363/56

FOREIGN PATENT DOCUMENTS 921476 3/1963 United Kingdom ............. 250/336.1

Primary Examiner—Peter S. Wong
Assistant Examiner—Judson H. Jones
Attorney, Agent, or Firm—Fleit, Jacobson, Cohn & Price

[57] ABSTRACT

A switch mode power supply comprises an oscillator arranged to drive the primary winding of a transformer. A nuclear impulse detector is arranged to discontinue drive to the primary winding in response to detection of a nuclear impulse.

13 Claims, 2 Drawing Figures

POWER SUPPLIES

This invention relates to power supplies and more particularly to a power supply of the switch mode type.

Transistor circuitry, particularly NMOS circuitry, is easily destroyed by the effects of radiation resulting from a nuclear explosion. The major damage to NMOS devices is in the form of ionisation, which changes the device threshold level to such an extent that the device will not function properly. The degree of ionisation occuring in these devices is a factor of the total accumulated gamma dose received. Such circuitry is less susceptible to damage if the supply of power is removed. Therefore by switching off the power a few microseconds after the initial leading edge of a gamma pulse, ionisation will be appreciably reduced (since the accumulated gamma dose is absorbed over a period of several seconds).

The invention seeks to provide a switch mode power supply which is automatically switched off upon detection of a nuclear explosion.

According to the invention there is provided a switch mode power supply comprising an oscillator arranged to drive the primary winding of a transformer, and a nuclear impulse detector arranged to discontinue drive to the primary winding in response to detection of a nuclear impulse.

The nuclear impulse detector may be responsive to gamma rays.

The nuclear impulse detector may be arranged to disable the oscillator upon detection of a nuclear impulse.

In a particularly advantageous form of the invention the nuclear impulse detector comprises a monostable trigger circuit which is triggered upon detection of a nuclear impulse and is effective to discontinue drive to the primary winding for a predetermined time interval.

The nuclear impulse detector may comprise a monostable trigger circuit comprising first and second voltage supply lines, a biasing circuit connected between the supply lines and comprising a series arrangement of a first resistor, a capacitor and a diode connected in that order between the first and second supply lines with the diode arranged to be forward biased, a first transistor of one polarity type having its base electrode coupled with the second supply line via a second resistor and its emitter electrode coupled with the junction between the diode and the capacitor, a second transistor of said one polarity type having its collector electrode coupled with the junction between the capacitor and the first resistor and its emitter electrode coupled with the second supply line, a third transistor of opposite polarity type having its base electrode coupled with the collector electrode of the first transistor via a first resistive means, its emitter electrode coupled with the first supply line and its collector electrode coupled with the base electrode of the second transistor via a second resistive means.

The first resistive means may comprise a voltage divider connected between the collector electrode of the first transistor and the first supply line and the base electrode of the third transistor may be coupled with a tapping point of the voltage divider.

The second resistive means may comprise a voltage divider connected between the collector of the third transistor and the second supply line and the base electrode of the second transistor may be coupled with a tapping point of the voltage divider.

A second diode may be provided connected in the biasing circuit between the first supply line and the first resistor and arranged to be forward biased.

The transistors are preferably bipolar transistors.

Figure 2:
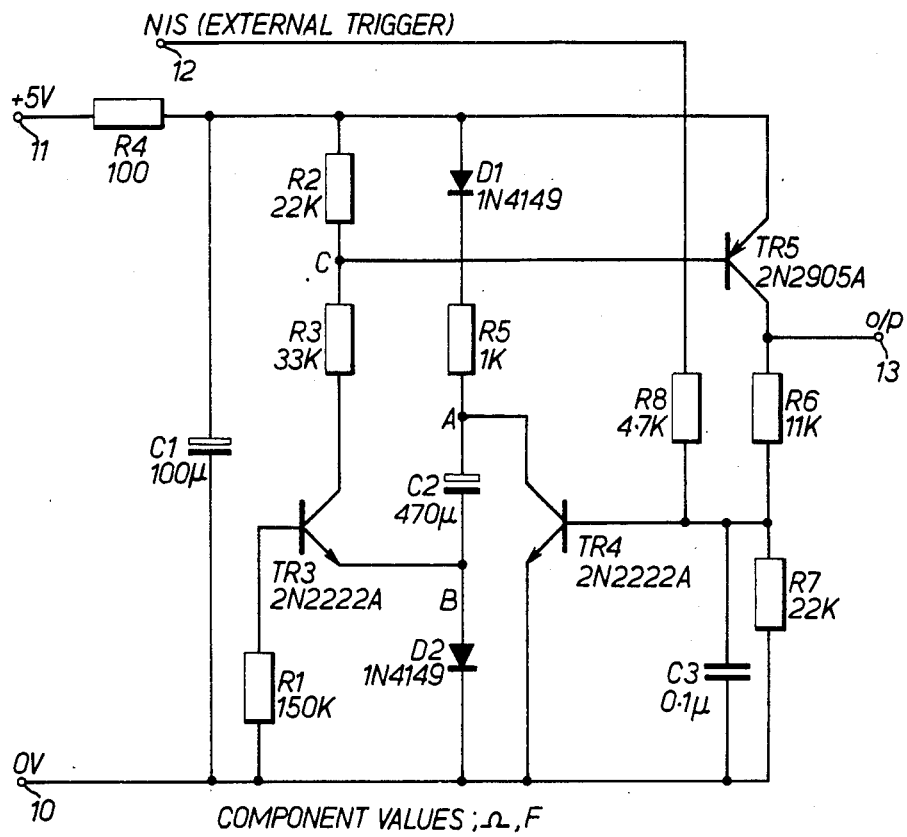

In order that the invention and its various other preferred features may be understood more easily, embodiments thereof will now be described, by way of example only, with reference to the drawings, in which:

FIG. 1 is a schematic block diagram of a switch mode power supply constructed in accordance with the invention, and FIG. 2 is a nuclear impulse detector suitable for incorporation in the arrangement of FIG. 1.

The drawing of FIG. 1 shows within a dotted outline a schematic illustration of a switch mode power supply of conventional type in which an oscillator 1 drives the primary winding P of a transformer T1 via a pair of transistors TR1 and TR2. The power supply has a d.c. input on terminals 2 and 3 which may be derived from a d.c. source or an a.c. source via rectifiers and smoothing capacitor. The secondary windings S1, S2, S3 can be used to feed different circuits and may be rectified to provide a d.c. output for example as shown following secondary winding S3. The d.c. voltage may be stabilised by any suitable means. Such power supplies are becoming increasingly popular in view of their high efficiency as compared with so called linear types.

In order to protect transistor circuits in the event of nuclear explosion it has been discovered that such circuits are less susceptible of damage if the supply of power to them is discontinued or switched off prior to the receipt of high intensity levels of the gamma wave resulting therefrom or before the total accumulated gamma radiation dose received rises to a significant level. Accordingly a nuclear impulse detector 2 is provided which is coupled with the oscillator and which serves to switch the oscillator off. The detector 2 is preferably responsive to the leading edge of a gamma radiation pulse and shutdown of the oscillator should be effected before the received gamma wave develops significant intensity or before the accumulated gamma dose rises to a destructive level. Although the detector could be arranged to shut down the power supply until manually reset, it is preferably arranged that it provides a monostable function in that it reacts quickly to the receipt of gamma radiation and maintains the power supply off until the gamma wave has passed. A suitable detector is shown in FIG. 2.

Referring now to FIG. 2 a monostable trigger circuit comprises three bipolar transistors TR3, TR4 and TR5. The first transistor TR3 has its base electrode connected to a zero volt d.c. supply line 10 via a resistor R1 and its collector electrode connected to a 5 volt positive supply line 11 via a potential divider circuit formed by resistors R2 and R3. The 5V supply line is smoothed by means of a resistor R4 and shunt capacitor C1 which together form a low pass filter.

A timing circuit is provided by a series arrangement between lines 11 and 10 comprising a diode D1, a resistor R5, a capacitor C2 and another diode D2 connected in that order with the diodes being arranged to be forward biased so that a current flows through the series arrangement between lines 11 and 10. The emitter electrode of TR3 is coupled to the junction between capacitor C2 and diode D2 (point B).

The second transistor T4 has its collector electrode connected to the junction between resistor R5 and capacitor C2 (point A) and its emitter electrode connected to line 10.

The third transistor TR5 has its emitter electrode connected to supply line 11, its collector electrode connected to line 10 via a voltage divider formed by resistors R6 and R7, the junction of which is coupled to the base electrode of transistor TR4, and its base electrode coupled to the junction between resistors R2 and R3 (point C). The base of transistor TR4 is decoupled to the line 10 via a capacitor C3 and is connected to a test terminal 12 via a resistor R8. An output 13 from the circuit is coupled to the emitter of TR5. The following components may be omitted in certain circumstances as they are not essential to the working of the circuit: C1, C3, R4, R8, D1. C1, C3 and R4 serve to reduce noise. The operation of the circuit is as follows:

In the untriggered state, point A is at +5V, B is at 0V, C is at +5V and all of the transistors TR3, TR4 and TR5 are non conductive or "off" and the output at terminal 13 is low. When a positive test pulse is applied to the base of TR2 it becomes conductive i.e. it is turned "on". This pulls the voltage of point A down towards 0V, which in turn causes the voltage at point B to approach −5V. The base-emitter junction of TR3 is now forward biased and so turned on which causes the voltage at point C to drop. Due to the Vbe of TR5, point C drops by 0.7V to +4.3V. TR5 is therefore turned on which in turn causes the voltage on the base of TR4 to become high and also produces a positive edge/level on the output 13. This regenerative action latches all the transistors on.

The voltage at point B begins to rise slowly as the charge on capacitor C2 discharges through resistors R3 and R2. After about 10 seconds the voltage at point B rises sufficiently to turn off TR3. The point C therefore rises to +5V causing TR5 to turn off. This in turn causes TR4 to turn off and the output on terminal 13 to go low. The capacitor C2 is then charged via the resistor R5 until point A is at +5V again.

The input 12 is for test purposes and the test pulse purely simulates the effect of gamma radiation incident on the circuit. The circuit is a discrete monostable which is triggered by induced photocurrents in response to the leading edge of a gamma radiation pulse resulting from a nuclear explosion. The monostable stays in the switched state for 10 seconds with the component values indicated and this is sufficient to stop any appreciable total dose of gamma radiation building up whilst the circuitry is powered.

With the component values shown in the circuit diagram a response time with a test trigger pulse has been measured as 7 microseconds. This reduces to 5 microseconds when triggered by gamma radiation at a dose rate of $8 \times 10^6$ Rads/sec. The reduction is because photocurrents caused by the radiation cause all transistors to switch simultaneously.

The circuit and power supply is susceptible of various modifications and changes within the scope of the claims e.g.

1. The circuit of FIGS. 1 and 2 could be produced employing P.N.P. transistors for TR1, TR2, TR3 and TR4 and an NPN transistor for TR5 with appropriate polarity supply lines.

2. The nuclear impulse detector can be arranged to stop the oscillator by any suitable means e.g. by opening a feedback path in the oscillator circuit, short circuiting an essential component or open circuiting part of the circuitry. The oscillator may include a switching element responsive to the detector 2, e.g. a thyristor, transistor, relay or HEXFET. The HEXFET has the advantage of stable operating parameters in the presence of nuclear radiation.

The arrangement provides the following advantages.

1. As the oscillator is normally running in the frequency range 20–100 KHZ, shutting down of the oscillator removes power to the outputs in 50 to 10 micro seconds.

2. A single monostable circuit can be employed to protect systems having many circuits with a variety of supplies. These supplies may be derived from secondaries of a single transformer as illustrated or from the secondaries of transformers of a plurality of switch mode power supplies each controlled by a single monostable circuit.

3. By controlling all power supply outputs by a single control function there is no need to short circuit each supply line ("crow bar" effect) and rely on power supply over current protection to avoid damage to the power supply.

The arrangement is particularly valuable in the protection of total dose sensitive NMOS devices, "latch up" prone CMOS and SchottkyTTL circuitry.

I claim:

1. A switch mode power supply comprising an oscillator arranged to drive the primary winding of a transformer and a nuclear impulse detector comprising a monostable trigger circuit which is triggered upon detection of a nuclear impulse and is effective to discontinue drive to the primary winding, wherein the monostable trigger circuit comprises first and second voltage supply lines, a biasing circuit connected between the supply lines and comprising a series arrangement of a first resistor, a capacitor and a diode connected in that order between the first and second supply lines with the diode arragned to be forward biased, a first transistor of one polarity type having its base electrode coupled with the second supply line via a second resistor and its emitter electrode coupled with the junction between the diode and the capacitor, a second transistor of said one polarity type having its collector electrode coupled with the junction between the capacitor and the first resistor and its emitter electrode coupled with the second supply line, a third transistor of opposite polarity type having its base electrode coupled with the collector electrode of the first transistor via a first resistive means, its emitter electrode coupled with the first supply line and its collector electrode coupled with the base electrode of the second transistor via a second resistive means.

2. A power supply is claimed in claim 1, wherein the nuclear impulse detector is responsive to gamma rays.

3. A power supply as claimed in claim 1, wherein the monostable trigger circuit is effective to discontinue drive to the primary winding for a predetermined time interval.

4. A power supply as claimed in claim 3, wherein the first resistive means comprises a voltage divider connected between the collector electrode of the first transistor and the first supply line and the base electrode of the third transistor is coupled with a tapping point of the voltage divider.

5. A power supply as claimed in claim 3, wherein the second resistive means comprises a voltage divider connected between the collector of the third transistor and the second supply line and the base electrode of the second transistor is coupled with a tapping point of the voltage divider.

6. A power supply as claimed in claim 3, including a second diode connected in the biasing circuit between the first supply line and the first resistor and arranged to be forward biased.

7. A power supply as claimed in claim 3 including a capacitor coupled between the base electrode of the second transistor and the second supply line.

8. A power supply as claimed in claim 1 wherein the transistors are bipolar transistors.

9. A power supply as claimed in claim 2, wherein the monostable trigger circuit is effective to discontinue drive to the primary winding for a predetermined time interval.

10. A power supply as claimed in claim 9, wherein the first resistive means comprises a voltage divider connected between the collector electrode of the first transistor and the first supply line and the base electrode of the third transistor is coupled with a tapping point of the voltage divider.

11. A power supply as claimed in claim 9, wherein the second resistive means comprises a voltage divider connected between the collector of the third transistor and the second supply line and the base electrode of the second transistor is coupled with a tapping point of the voltage divider.

12. A power supply as claimed in claim 9, including a second diode connected in the biasing circuit between the first supply line and the first resistor and arranged to be forward biased.

13. A power supply as claimed in claim 9, including a capacitor coupled between the base electrode of the second transistor and the second supply line.

* * * * *